United States Patent
Hokuto

(10) Patent No.: US 8,316,834 B2
(45) Date of Patent: Nov. 27, 2012

(54) CONTROL DEVICE AND CONTROL METHOD FOR INTERNAL COMBUSTION ENGINE

(75) Inventor: Hiroyuki Hokuto, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 382 days.

(21) Appl. No.: 12/673,392

(22) PCT Filed: Aug. 8, 2008

(86) PCT No.: PCT/IB2008/002095
§ 371 (c)(1),
(2), (4) Date: Feb. 12, 2010

(87) PCT Pub. No.: WO2009/022212
PCT Pub. Date: Feb. 19, 2009

(65) Prior Publication Data
US 2012/0031374 A1    Feb. 9, 2012

(30) Foreign Application Priority Data
Aug. 13, 2007    (JP) .................. 2007-211036

(51) Int. Cl.
*F02D 41/00* (2006.01)
*F02D 41/02* (2006.01)

(52) U.S. Cl. ............... 123/688; 123/674; 701/109

(58) Field of Classification Search .......... 123/688, 123/703, 479, 494, 575–578, 198 D, 674, 123/1 A; 701/109, 114, 103; 60/276
See application file for complete search history.

(56) References Cited

U.S. PATENT DOCUMENTS

| | | | |
|---|---|---|---|
| 4,957,087 A * | 9/1990 | Ota ........................... | 123/479 |
| 4,989,570 A * | 2/1991 | Kuribara et al. .............. | 123/494 |
| 5,121,732 A | 6/1992 | Benninger et al. | |
| 5,881,703 A | 3/1999 | Nankee, II et al. | |
| 6,257,174 B1 | 7/2001 | Huff et al. | |
| 6,714,856 B2 * | 3/2004 | Huff et al. ................... | 701/114 |
| 2002/0083927 A1 | 7/2002 | Bayerle et al. | |
| 2003/0075119 A1 | 4/2003 | Huff et al. | |

FOREIGN PATENT DOCUMENTS

| | | |
|---|---|---|
| DE | 41 12 574 C2 | 10/1991 |
| DE | 41 17 440 | 12/1991 |
| DE | 100 63 677 | 7/2002 |
| EP | 1 304 466 | 4/2003 |
| JP | 3 37343 | 2/1991 |
| JP | 03054345 A * | 3/1991 |
| WO | 2008 000550 | 1/2008 |

OTHER PUBLICATIONS

German Office Action issued on Jun. 12, 2012, in patent Application No. 11 2008 002 129.5 with English Translation.

* cited by examiner

*Primary Examiner* — Mahmoud Gimie
(74) *Attorney, Agent, or Firm* — Oblon, Spivak, McClelland, Maier & Neustadt, L.L.P.

(57) ABSTRACT

A control device for an internal combustion engine includes: an abnormality determination portion determining the presence of an abnormality in a fuel system, such as an injector, by comparing an air-fuel ratio detected by an A/F sensor and a learning value of the air-fuel ratio with a preset abnormality determination value; an alcohol concentration estimating portion estimating the alcohol concentration in fuel based on the air-fuel ratio detected by the A/F sensor and the learning value; and an abnormality determination value changing portion changing the abnormality determination value depending on the alcohol concentration estimated by the alcohol concentration estimating portion.

10 Claims, 6 Drawing Sheets

CONTROL DEVICE AND CONTROL METHOD FOR INTERNAL COMBUSTION ENGINE

BACKGROUND OF THE INVENTION

1. Field of the Invention

This invention relates to a control device and control method for an internal combustion engine for correcting fuel injection amount based on the air-fuel ratio. More particularly, this invention relates to a control device and control method for an internal combustion which is operable by an alcohol blended fuel in which fuel is blended with alcohol.

2. Description of the Related Art

A general internal combustion engine, which has an A/F (air-fuel ratio) sensor or $O_2$ (oxygen) sensor disposed in an exhaust pipe, controls an air-fuel ratio based on an output signal from the A/F sensor or $O_2$ sensor. For example, because the A/F sensor is an oxygen sensor having linear output characteristics with respect to the air-fuel ratio, feedback control is executed on fuel injection amount to keep an air-fuel ratio (exhaust gas air-fuel ratio) of exhaust gas at a target air fuel ratio based on the output signal from the A/F sensor.

Also, the internal combustion engine determines the presence of an abnormality in a fuel injection device on the basis of an output signal of the A/F sensor. For instance, when the difference between the target air-fuel ratio that is set depending on an operational state of the internal combustion engine and the exhaust gas air-fuel ratio that is calculated based on the output signal of the A/F sensor becomes greater than a predetermined value that is set beforehand, it is determined that the fuel injection device is not functioning normally.

In recent years, so-called a multifuel internal combustion engine has been used for compensating the disadvantages of a plurality of fuels with different fuel properties and at the same time mutually complementing the advantages of these fuels. A vehicle installed with this multifuel internal combustion engine is generally called "flexible fuel vehicle (FFV)." For example, there is known an FFV which is designed to improve the environmental performance by improving emission performance of the internal combustion engine of the vehicle and discouraging consumption of a fossil fuel such as gasoline fuel by using gasoline fuel, ethanol, or other alcohol fuel alone or a mixture of these alcohol fuels depending on the required performance.

Alcohol fuel, however, is richer in theoretical air-fuel ratio than gasoline fuel because alcohol fuel contains a larger amount of oxygen than gasoline fuel. For this reason, the exhaust gas air-fuel ratio that is fed back by the A/F sensor is shifted to a lean side with respect to the target air-fuel ratio (theoretical air-fuel ratio) of the gasoline fuel, and the fuel injection amount has to be changed to an increase side even when the intake air amount is not changed. As a result, a learning correction value is shifted significantly. Consequently, the difference between the target air-fuel ratio and the exhaust gas air-fuel ratio fed back by the A/F sensor increases excessively, whereby the internal combustion engine might mistakenly determine that the fuel injection device functions abnormally.

For example, a fuel supply device for an internal combustion engine, which is disclosed in Japanese Patent Application Publication No. 03-037343 (JP-A-03-037343), determines the presence of an abnormality in an injector and fuel injection pump based on the intake air amount obtained during idling and the time required for expansion stroke of each cylinder, when the alcohol concentration of fuel and an air-fuel ratio of intake air mixture are within a predetermined range.

The fuel supply device for an internal combustion engine according to the related art described above, however, determines the presence of an abnormality in the injector and fuel injection pump when the alcohol concentration of the fuel and the air-fuel ratio of the intake air mixture are within the predetermined range. Thus, when the alcohol concentration of the fuel and the air-fuel ratio of the intake air mixture are beyond the predetermined range, the presence of an abnormality in the injector and fuel injection pump cannot be determined. Furthermore, because this fuel supply device uses an alcohol sensor to detect the alcohol concentration of the fuel, the structure of the fuel supply device is made complicated and cost increase is incurred.

SUMMARY OF THE INVENTION

This invention provides a control device and method for an internal combustion engine, which is capable of highly accurately determining the presence of an abnormality in the fuel system regardless of the alcohol content in fuel.

A control device for an internal combustion engine according to a first aspect of the invention has: fuel injection amount setting means for setting a fuel injection amount based on an operational state of an internal combustion engine; fuel injection means for injecting a predetermined amount of fuel that is set by the fuel injection amount setting means; air-fuel ratio detection means for detecting an air-fuel ratio of the internal combustion engine; abnormality determination means for determining the presence of an abnormality in the fuel injection means by comparing the air-fuel ratio detected by the air-fuel ratio detection means with a preset abnormality determination value; alcohol content level determination means for determining an alcohol content level in the fuel based on the air-fuel ratio detected by the air-fuel ratio detection means; and abnormality determination value changing means for changing the abnormality determination value depending on the alcohol content level determined by the alcohol content level determination means.

In the control device for an internal combustion engine according to the first aspect of the invention, the abnormality determination value may be increased or decreased in proportion to the alcohol content level, and the abnormality determination means may determine the presence of an abnormality in the fuel injection means when the air-fuel ratio detected by the fuel-air ratio detection means exceeds the abnormality determination value.

In the control device for an internal combustion engine according to the first aspect of the invention, the abnormality determination value may be set based on the air-fuel ratio detected by the air-fuel ratio detection means and a learning value of the air-fuel ratio.

In the control device for an internal combustion engine according to the first aspect of the invention, the learning value of the air-fuel ratio may be used for correcting the air-fuel ratio detected by the air-fuel ratio detection means, in accordance with the alcohol content level of the injected fuel.

In the control device for an internal combustion engine according to the first aspect of the invention, the alcohol content level determination means may determine that the alcohol content level is high, when a sum of the air-fuel ratio detected by the air-fuel ratio detection means and the learning value of the air-fuel ratio exceeds a preset air-fuel ratio threshold.

In the control device for an internal combustion engine according to the first aspect of the invention, knock detection means for detecting a knocking generated in the internal combustion engine is further provided, and the alcohol content level determination means may determine that the alcohol content level is high, when the sum of the air-fuel ratio detected by the air-fuel ratio detection means and the learning value of the air-fuel ratio exceeds the preset air-fuel ratio threshold and when a learning value of an ignition timing that is set in accordance with the knocking detected by the knock detection means exists on an advance side of a preset ignition timing threshold.

In the control device for an internal combustion engine, according to the first aspect of the invention, idle air amount detection means for detecting an idle air amount in the internal combustion engine is further provided, and the alcohol content level determination means may determine that the alcohol content level is high, when the sum of the air-fuel ratio detected by the air-fuel ratio detection means and the learning value of the air-fuel ratio exceeds the preset air-fuel ratio threshold and when the idle air amount detected by the idle air amount detection means exceeds a preset air amount threshold.

The control device for an internal combustion engine according to the first aspect of the invention is provided with the abnormality determination mean for determining the presence of an abnormality in the fuel injection means by comparing the air-fuel ratio with the preset abnormality determination value, and the abnormality determination value changing means for changing the abnormality determination value depending on the alcohol content level in the fuel determined based on the air-fuel ratio. Therefore, the presence of an abnormality in the fuel system can be determined highly accurately regardless of the alcohol content in the fuel, by changing the abnormality determination value that is used for determining the presence of an abnormality in the fuel injection means in accordance with the alcohol content level.

A control method for an internal combustion engine according to the second aspect of the invention includes: setting a fuel injection amount based on an operational state of an internal combustion engine; injecting a set predetermined amount of fuel; detecting an air-fuel ratio of the internal combustion engine; and determining the presence of an abnormality in fuel injection means for injecting the set predetermined amount of fuel, by comparing the detected air-fuel ratio with a preset abnormality determination value, wherein an alcohol content level in the fuel is determined based on the detected air-fuel ratio, and the abnormality determination value is changed depending on the determined alcohol content level.

In the control method for an internal combustion engine according to a second aspect of the invention, the presence of an abnormality in the fuel injection means is determined by comparing the air-fuel ratio and the preset abnormality determination value, and the abnormality determination value is changed depending on the alcohol content level in the fuel that is determined based on the air-fuel ratio. Therefore, the presence of an abnormality in the fuel system can be determined highly accurately regardless of the alcohol content in the fuel, by changing the abnormality determination value that is used for determining the presence of an abnormality in the fuel injection means in accordance with the alcohol content level.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

An embodiment of the control device for an internal combustion engine according to the invention is described hereinafter in detail with reference to the drawings. However, the present invention is not to be limited to this embodiment.

Figure 1:
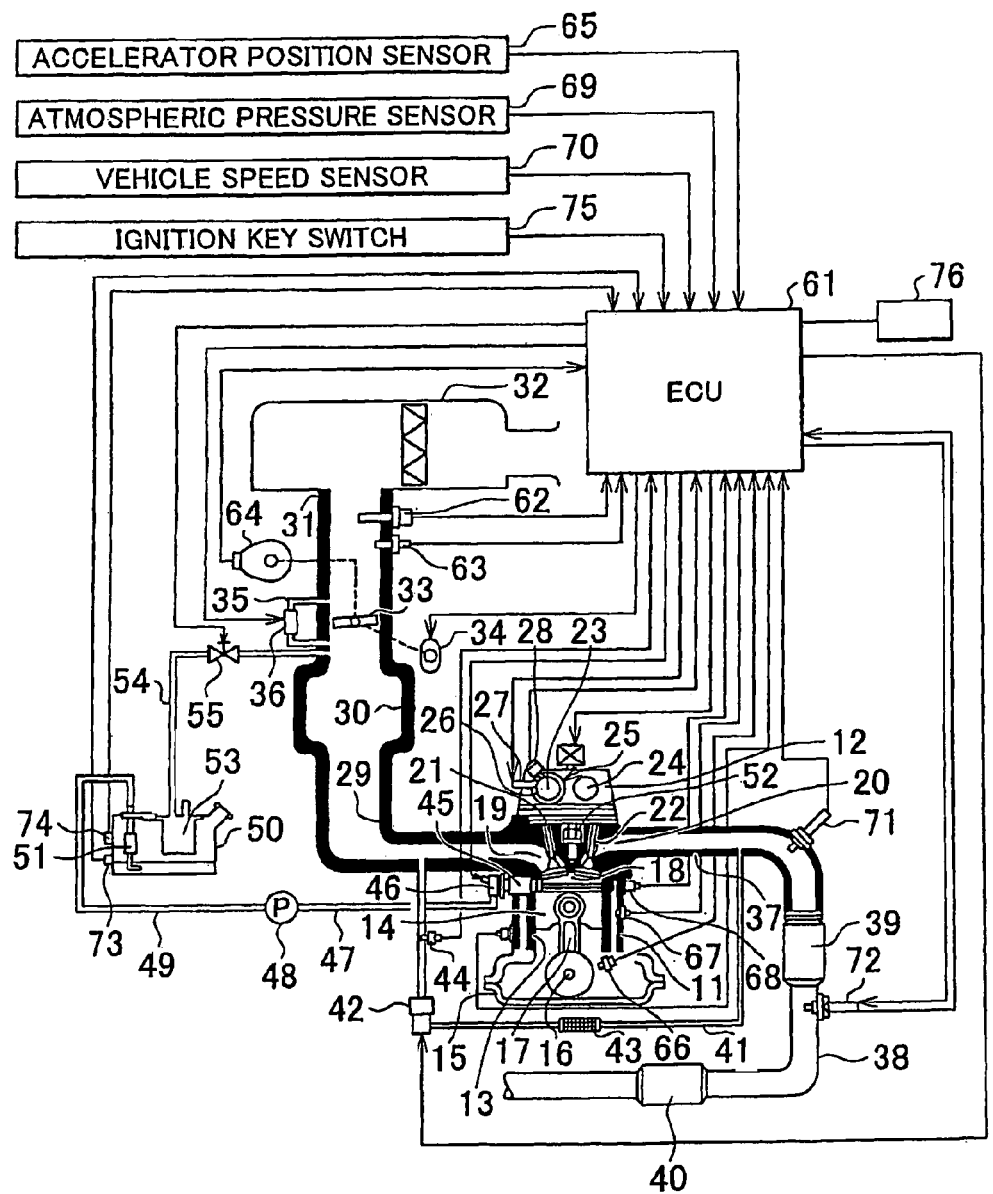
FIG. 1 is a schematic configuration diagram showing a control device for an internal combustion engine according to an embodiment of the invention.
Figure 2:
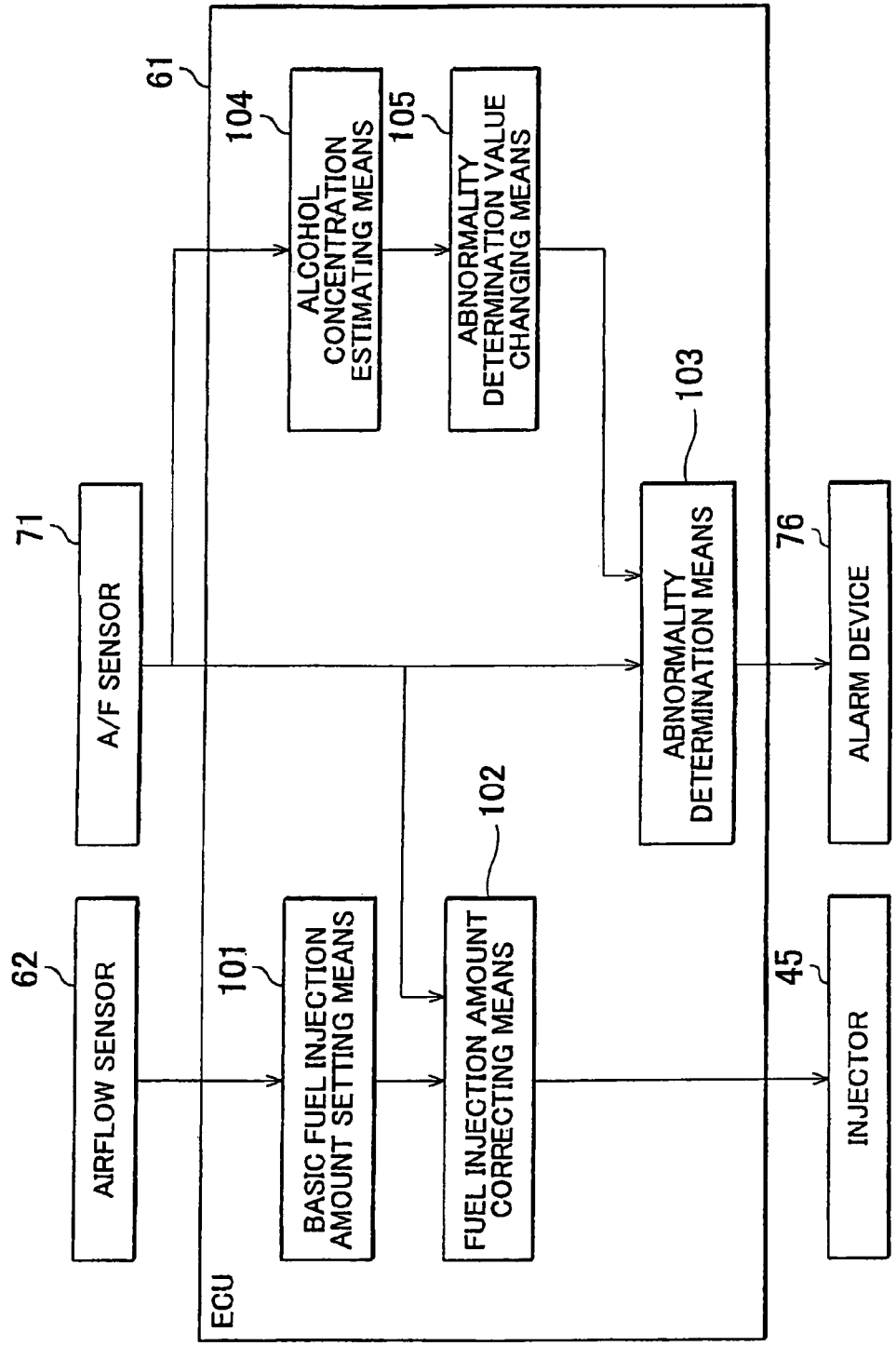
FIG. 2 is a control block diagram of the control device for an internal combustion engine according to the embodiment.
Figure 3:
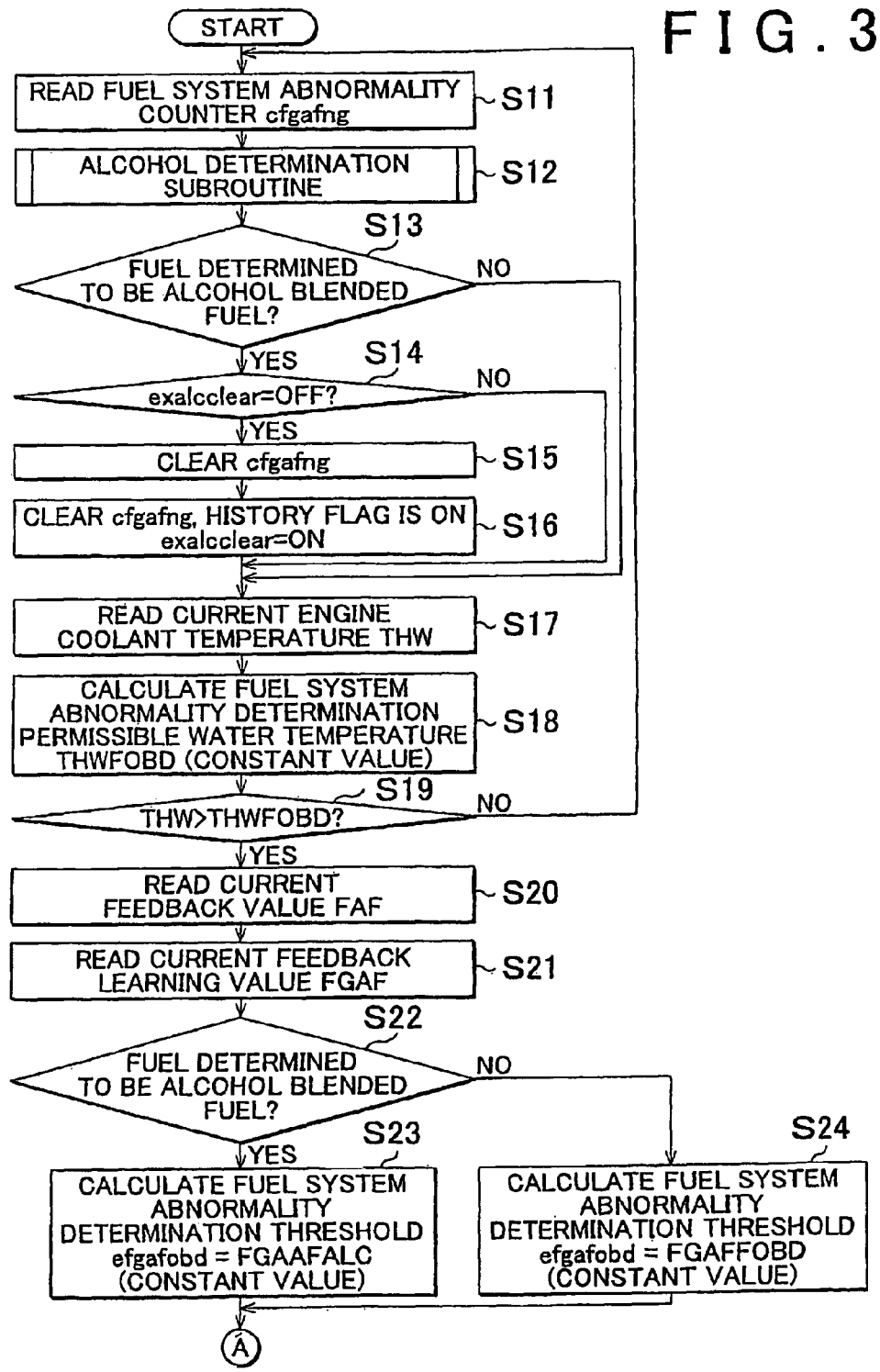
FIG. 3 is a flowchart showing fuel system abnormality determination control performed by the control device for an internal combustion engine according to the embodiment.
Figure 4:
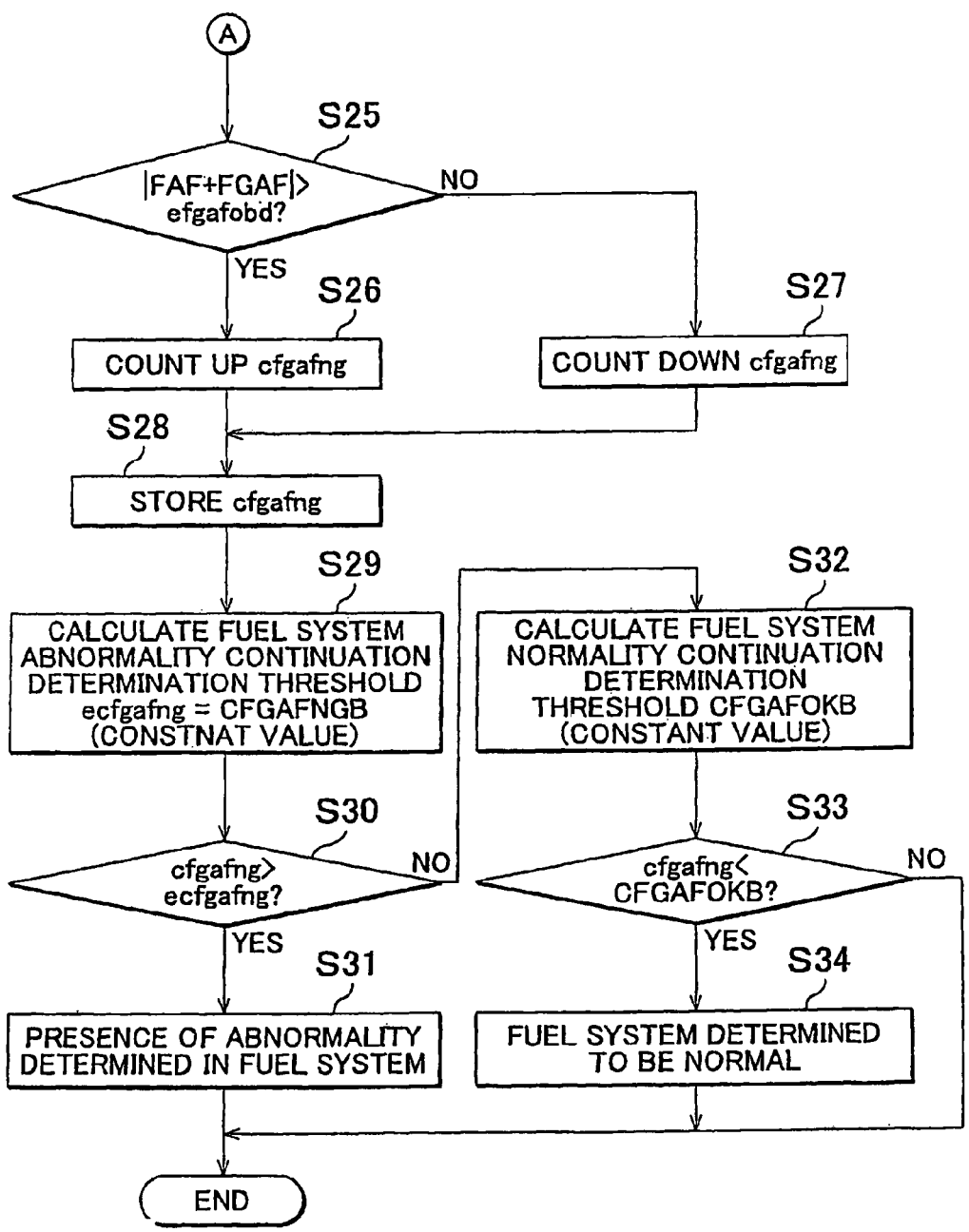
FIG. 4 is a flowchart showing fuel system abnormality determination control performed by the control device for an internal combustion engine according to the embodiment.
Figure 5:
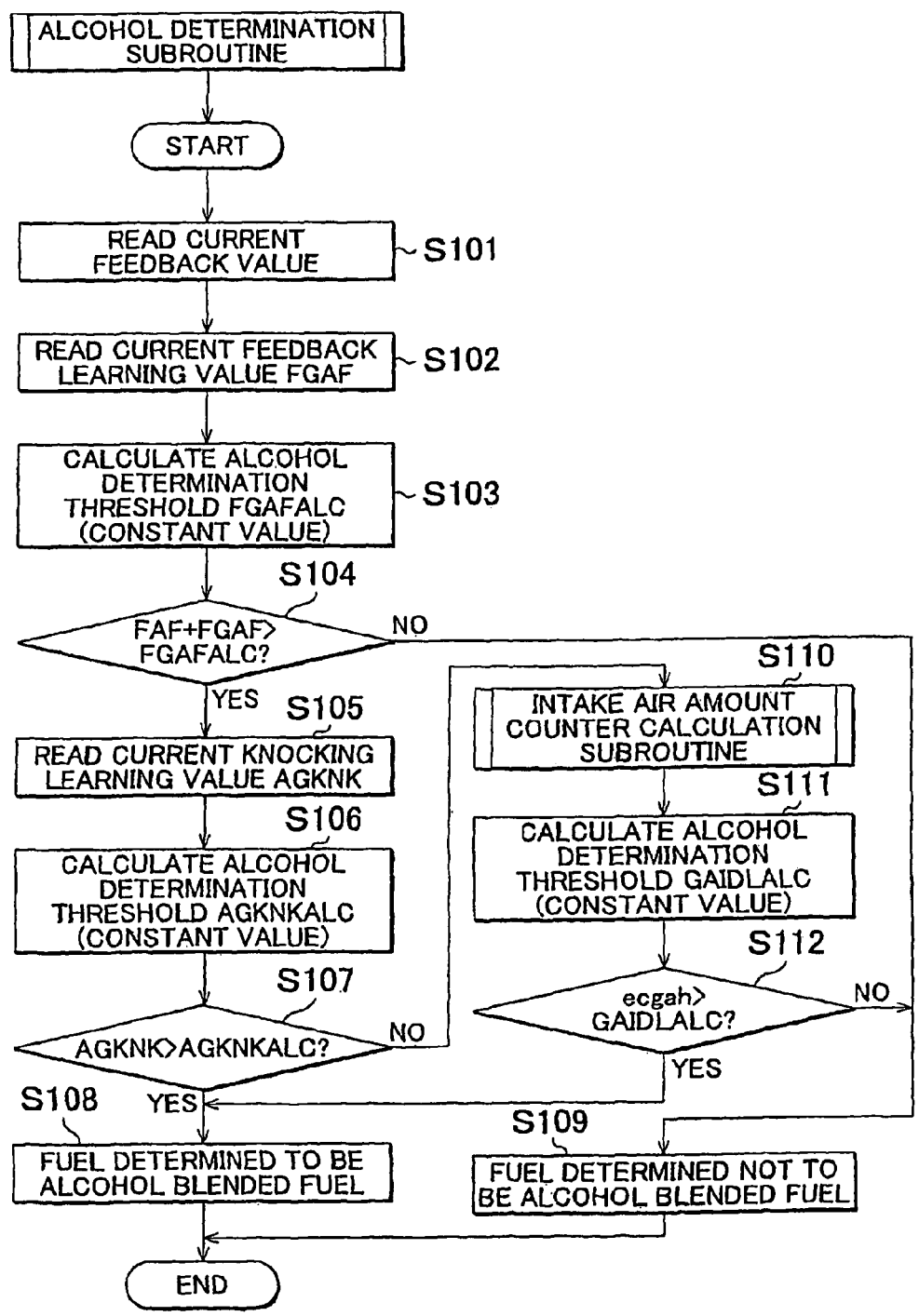
FIG. 5 is a flowchart showing alcohol fuel determination control performed by the control device for an internal combustion engine according to the embodiment.
Figure 6:
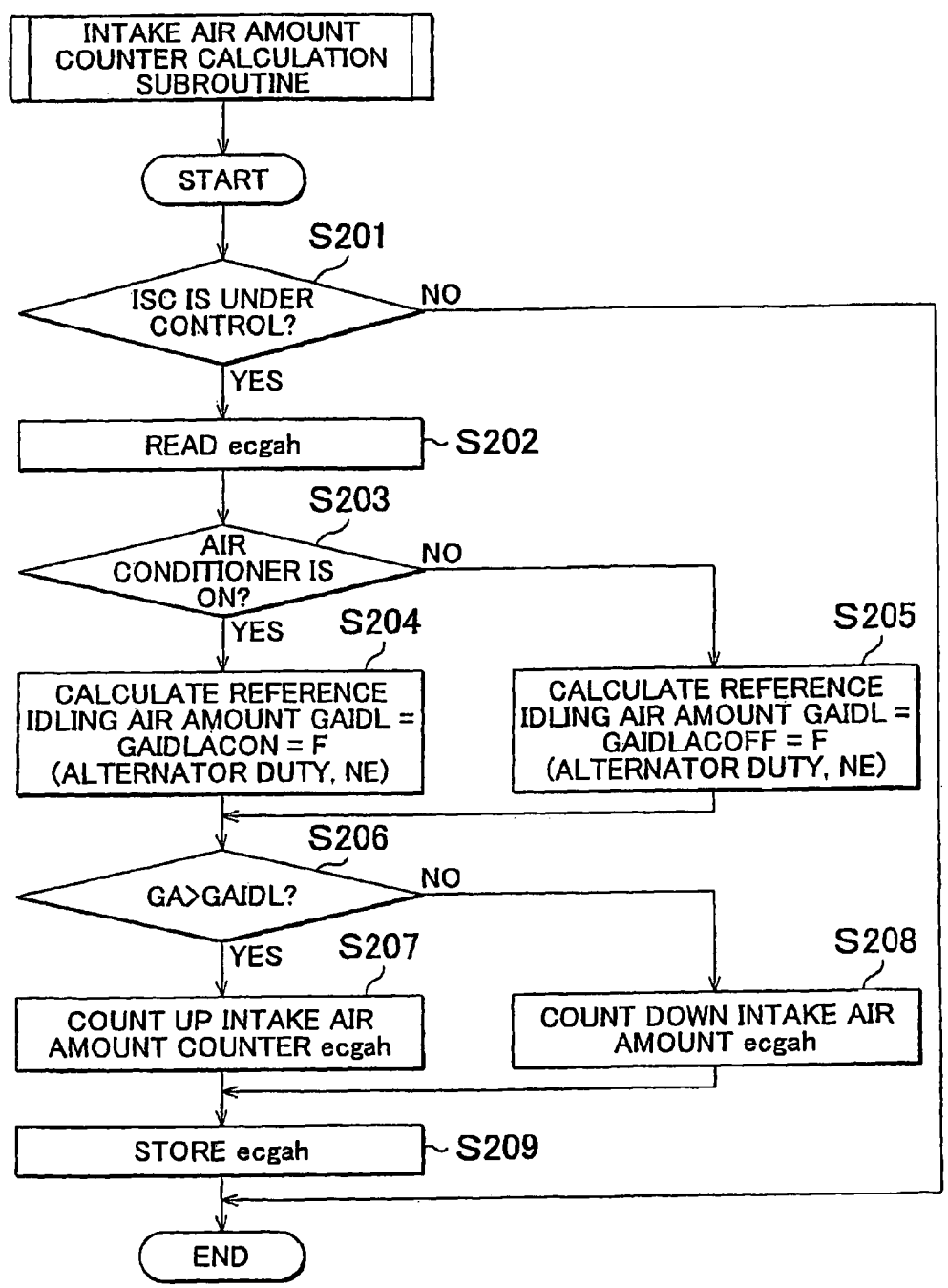
FIG. 6 is a flowchart showing intake air amount calculation control performed by the control device for an internal combustion engine according to the embodiment.

FIG. 1 is a schematic configuration diagram showing the control device for an internal combustion engine according to an embodiment of the invention. FIG. 2 is a control block diagram of the control device for an internal combustion engine according to the embodiment. FIGS. 3 and 4 are flowcharts each showing fuel system abnormality determination control performed by the control device for an internal combustion engine according to the embodiment. FIG. 5 is a flowchart showing alcohol fuel determination control performed by the control device for an internal combustion engine according to the embodiment. FIG. 6 is a flowchart showing intake air amount calculation control performed by the control device for an internal combustion engine according to the embodiment.

In the control device for an internal combustion engine according to the embodiment, a cylinder head 12 is fixedly mounted on a cylinder block 11 and pistons 14 are fitted for vertical movement into a plurality of cylinder bores 13 formed in the cylinder block 11, as shown in FIG. 1. A crankcase 15 is fixedly mounted underneath the cylinder block 11. A crankshaft 16 is rotatably supported in the crankcase 15, and each of the pistons 14 is coupled to the crankshaft 16 via a connecting rod 17.

Each combustion chamber 18 is defined by wall surfaces of the cylinder bores 13 of the cylinder block 11, a bottom surface of the cylinder head 12 and top surfaces of the pistons 14, and is in the shape of a pentroof or, in other words, has inclined surfaces that make the center of the upper part (the lower surface of the cylinder head 12) of the combustion chamber 18 higher than the other parts. An intake port 19 and an exhaust port 20 are formed in the upper part of the combustion chamber 18, i.e., the lower surface of the cylinder head 12, such that the intake port 19 is opposed to the exhaust port 20. Lower ends of an intake valve 21 and exhaust valve 22 are positioned at the intake port 19 and the exhaust port 20, respectively. The intake valve 21 and the exhaust valve 22 are supported by the cylinder head 12 so as to be able to move freely, in axial directions of the intake valve 21 and exhaust valve 22, and are urged in such directions as to close the intake port 19 and the exhaust port 20 (upward direction in FIG. 1).

Also, an intake camshaft 23 and an exhaust camshaft 24 are supported rotatably by the cylinder head 12, and upper ends of the intake valve 21, and exhaust valve 22 are in contact with an intake cam and exhaust cam, respectively.

Although not shown, a crankshaft sprocket joined to the crankshaft 16 and camshaft sprockets joined to the intake camshaft 23 and exhaust camshaft 24 respectively are connected with one another by an endless timing chain so that the crankshaft 16, the intake camshaft 23 and the exhaust cam shaft 24 can be interlocked with one another.

Therefore, when the intake camshaft 23 and the exhaust camshaft 24 rotate in synchronism with the crankshaft 16, the intake cam and the exhaust cam move the intake valve 21 and the exhaust valve 22 up and down respectively in predetermined timings. With the movements of the intake valve 21 and the exhaust valve 22, the intake port 19 and the exhaust port 20 are opened and closed so that the intake port 19 and the exhaust port 20 can be brought into communication with the respective combustion chambers 18. In this case, the intake camshaft 23 and the exhaust camshaft 24 are each configured to rotate once (360°) for every two revolutions (720°) of the crankshaft 16. For this reason, the engine can execute four strokes, namely, intake stroke, compression stroke, expansion stroke and exhaust stroke, during two revolutions of the crankshaft 16. At this moment, the intake camshaft 23 and the exhaust camshaft 24 rotate once.

The valve gear of this engine is configured as an intake variable valve timing-intelligent (VVT) system 25 for controlling the intake valve 21 and the exhaust valve 22 in optimal opening and closing timings in accordance with the operating conditions of the engine. In this intake VVT system 25, an axial end of the intake camshaft 23 is provided with a VVT controller 26. Hydraulic pressure is applied from an oil control valve 27 to an advancing chamber and a retarding chamber (not shown) of the VVT controller 26 to change the phase of the intake camshaft 23 relative to a cam sprocket, whereby the opening and closing timings of the intake valve 21 can be advanced or retarded. In this case, the intake VVT system 25 advances or retards the opening and closing timings of the intake valve 21 while keeping the operation angle (opening period) of the intake valve 21 constant. In addition, the intake camshaft 23 is provided with a cam position sensor 28 for detecting the rotation phase of the intake camshaft 23.

A surge tank 30 is coupled to the intake port 19 via an intake manifold 29, and an intake pipe 31 is coupled to this surge tank 30. An air cleaner 32 is attached to an air inlet of the intake pipe 31. An electronic throttle device 34 having a throttle valve 33 is provided on the downstream side of the air cleaner 32. The intake port 19 is further provided with a bypass passage 35 that bypasses the throttle valve 33, and this bypass passage 35 is provided with an idle speed control valve 36.

An exhaust pipe 38 is coupled to the exhaust port 20 via an exhaust manifold 37, and a ternary catalyst 39 and NOx storage-reduction catalyst 40 for purifying toxic substances contained in exhaust gas are mounted in the exhaust pipe 38. The ternary catalyst 39 purifies HC, CO and NOx of exhaust gas at once by means of an oxidation-reduction reaction, when the air-fuel ratio (exhaust gas air-fuel ratio) is stoichiometric. The NOx storage-reduction catalyst 40 stores NOx of the exhaust gas once when the air-fuel ratio (exhaust gas air-fuel ratio) is lean, discharges the stored NOx when the air-fuel ratio (exhaust gas air-fuel ratio) is in a rich combustion region or stoichiometric region where oxygen concentration of the exhaust gas is reduced, and reduces the NOx by using fuel added as reducing agent.

An exhaust gas recirculation passage (EGR passage) 41 is provided between the downstream side of the surge tank 30 of the intake pipe 31 and the upstream side of the ternary catalyst 39 of the exhaust pipe 38, and this EGR passage 41 is provided with and EGR valve 42 and an EGR cooler 43. Within the EGR passage 41, an EGR gas temperature sensor 44 for detecting the temperature of EGR gas is disposed at a position near the intake pipe 31 in relation to the EGR valve 42 of the EGR passage 41.

An injector 45 for injecting fuel directly into the combustion chamber 18 is mounted in the cylinder head 12. This injector 45 is disposed near the intake port 19 and inclined downward at a predetermined angle from a horizontal upper end. The injector 45 mounted in each cylinder is coupled to a delivery pipe 46. To the delivery pipe 46 is coupled a high-pressure fuel pump 48 via a high-pressure fuel supply pipe 47. A low-pressure fuel pump (feed pump) 51 provided within a fuel tank 50 is coupled to the high-fuel pressure pump 48 via a low-pressure fuel supply pipe 49. The low-pressure fuel pump 51 pressurizes the fuel contained in the fuel tank 50 to a predetermined low pressure and supplies this fuel to the low-pressure fuel supply pipe 49. The high-pressure fuel pump 48 pressurizes the low-pressure fuel of the low-pressure fuel supply pipe 49 to a predetermined high pressure and supplies this fuel to the delivery pipe 46 via the high-pressure fuel supply pipe 47. The injector 45 can inject the high-pressure fuel of the delivery pipe 46 to the combustion chamber 18. In the cylinder head 12 is mounted a spark plug 52 which is positioned above the combustion chamber 18 and ignites an air-fuel mixture.

Furthermore, a canister 53 is provided within the fuel tank 50. This canister 53 is connected to the upstream side of the surge tank 30 of the intake pipe 31 by a purge passage 54. The purge passage 54 is provided with a purge valve 55. The canister 53 adsorbs purge gas that contains vapor (evaporated fuel) generated in the fuel tank 50, and by opening the purge valve 55 discharges the adsorbed purge gas to the intake pipe 31 via the purge passage 54.

A vehicle is installed with an electronic control unit (ECU) 61. The ECU 61, capable of controlling the fuel injection timing of the injector 45 and the ignition timing of the spark plug 52, determines the fuel injection amount, the injection timing, and the ignition timing based on the operating conditions of the engine, such as intake air amount, intake air temperature, throttle opening, accelerator operation amount, engine speed, and coolant temperature that are detected.

Specifically, an airflow sensor 62 and intake air temperature sensor 63 are mounted on the upstream side of the intake pipe 31 to output measured intake air amount and intake air temperature to the ECU 61. The electronic throttle device 34 is provided with a throttle position sensor 64 and an accelerator pedal is provided with an accelerator position sensor 65 to output the current throttle opening and accelerator operation amount to the ECU 61. The crankshaft 16 is provided with a crank angle sensor 66 for outputting a detected crank angle to the ECU 61. The ECU 61 determines which one of the intake stroke, compression stroke, expansion stroke and exhaust stroke is performed by each cylinder, and calculates the engine speed, on the basis of the crank angle. Moreover, a water temperature sensor 67 is provided in the cylinder block 11 to output a detected engine coolant temperature to the ECU 61. The cylinder block 11 is provided with a knock sensor 68 for outputting a detected knock signal to the ECU 61.

The vehicle is also provided with an atmospheric pressure sensor 69 for outputting a detected atmospheric pressure to the ECU 61. The vehicle is further provided with a vehicle speed sensor 70 for outputting a detected vehicle speed to the ECU 61.

An air-fuel ratio (A/F) sensor 71 is provided on the upstream side of the ternary catalyst 39 of the exhaust pipe 38, and an oxygen ($O_2$) sensor 72 is provided on the downstream side of the ternary catalyst 39. The A/F sensor 71 and the $O_2$ sensor 72 detect an exhaust gas air-fuel ratio (the amount of oxygen) of the exhaust gas emitted from the combustion chamber 18 to the exhaust pipe 38 through the exhaust port 20 and exhaust manifold 37, and output the detected exhaust gas air-fuel ratio to the ECU 61. The ECU 61 feeds back the exhaust gas air-fuel ratio detected by the A/F sensor 71 and the $O_2$ sensor 72. More specifically, the ECU 61 compares the detected exhaust gas air-fuel ratio with a target air-fuel ratio, which is set according to the operating conditions of the engine, and thereby corrects the fuel injection amount.

The fuel tank 50 is provided with a remaining amount sensor 73 for detecting the remaining amount of accumulated fuel, and the detected fuel remaining amount is output to the ECU 61. The fuel tank 50 is provided with a tank temperature sensor 74 for detecting the temperature of the fuel tank 50, and the detected temperature of the fuel tank 50 is output to the ECU 61.

The driver seat of the vehicle is provided with an ignition key switch 75, and the ON/OFF state thereof is output to the ECU 61.

The ECU 61 is also capable of controlling the intake VVT system 25 based on the operating conditions of the engine. Specifically, when the engine runs at a low temperature or at a light load, or when the engine starts or runs during idling, the intake VVT system 25 is controlled to eliminate an overlap between the closing timing of the exhaust valve 22 and the opening timing of the intake valve 21 so as to reduce the amount of exhaust gas that flows back to the intake port 19 or the combustion chamber 18, whereby the combustion stability and the improvement of fuel efficiency are realized. Moreover, when the engine runs at a middle load, the overlap is increased to raise the internal EGR rate and improve the exhaust gas purification efficiency while reducing the pumping loss, whereby the improvement of fuel efficiency is realized. Furthermore, when the engine runs at a high load and a low or middle speed, the intake VVT system 25 advances the closing timing of the intake valve 21 to reduce the amount of intake air that flows back to the intake port 19, so that volumetric efficiency is improved. When the engine runs at a high load and a high speed, the intake VVT system 25 retards the closing timing of the intake valve 21 in accordance with the engine speed to obtain a timing that matches the inertia force of the intake air, so that the volumetric efficiency is improved.

Incidentally, the engine of this embodiment can use an alcohol blended fuel obtained by blending a gasoline fuel with an alcohol fuel such as ethanol in predetermined proportion, and is designed to improve the environmental performance by improving emission performance of the engine and discouraging consumption of a fossil fuel such as gasoline fuel. The alcohol blended fuel, however, is richer in theoretical air-fuel ratio than gasoline fuel because alcohol fuel contains a larger amount of oxygen than gasoline fuel. For this reason, the exhaust gas air-fuel ratio that is fed back by the A/F sensor is shifted to a lean side with respect to the target air-fuel ratio (theoretical air-fuel ratio) of the gasoline fuel, and the fuel injection amount has to be changed to the increase side even when the intake air amount is not changed. As a result, a learning correction value is shifted significantly. Normally, the ECU 61 determines the presence of an abnormality in the fuel system in accordance with an air-fuel ratio feedback value detected by the A/F sensor 71 or a learning correction value. For this reason, even when the fuel system functions normally, use of the alcohol blended fuel shifts the air-fuel ratio feedback value or the learning correction value significantly, whereby the engine might mistakenly determine that the fuel system functions abnormally.

Therefore, as shown in FIGS. 1 and 2, the ECU 61, in the control device for an internal combustion engine according to the embodiment, is provided with basic fuel injection amount setting means 101 for setting a basic fuel injection amount based on the engine operating conditions, such as the intake air amount detected by the airflow sensor 62, and fuel injection amount correcting means 102 for correcting the basic fuel injection amount set by the basic fuel injection amount setting means 101 by using the air-fuel ratio detected by the A/F sensor (air-fuel ratio detection means) 71. The injector (fuel injection means) 45 can inject a predetermined amount of fuel that is corrected by the fuel injection amount correcting means 102.

The ECU 61 further has: abnormality determination means 103 for determining the presence of an abnormality in the fuel system, such as the injector 45, by comparing the air-fuel ratio detected by the A/F sensor 71 and a learning value with a previously set abnormality determination value; alcohol concentration estimating means (alcohol content level determination means) 104 for estimating the alcohol concentration (alcohol content level) in the fuel based on the air-fuel ratio detected by the A/F sensor 71 and the learning value; and abnormality determination value changing means 105 for changing the abnormality determination value based on the alcohol concentration estimated by the alcohol concentration estimating means 104. The abnormality determination means 103 determines the presence of an abnormality in the fuel system, such as the injector 45, by using the abnormality determination value that is set based on the alcohol concentration estimated by the alcohol concentration estimating means 104. The ECU 61 an alarm device 76 when the presence of an abnormality is determined in the fuel system.

In this embodiment, the ECU 61 increases or reduces the abnormality determination value in proportion to the alcohol concentration, and the abnormality determination means 103 determines the presence of an abnormality in the fuel system when the air-fuel ratio detected by the A/F sensor 71 and the learning value exceed the abnormality determination value.

Also, in this embodiment, the abnormality determination means 103 of the ECU 61 has an abnormality determination counter for counting the number of times the air-fuel ratio detected by the A/F sensor 71 and the learning value exceed the abnormality determination value, and determines the presence of an abnormality in the fuel system when the number of times counted by the abnormality determination counter exceeds a previously set count threshold.

The knock sensor (knock detection means) 68 for detecting a knocking of the engine is provided in this embodiment. The alcohol concentration estimating means 104 of the ECU 61 determines that the alcohol concentration is high, when the sum of the air-fuel ratio detected by the A/F sensor 71 and the learning value exceeds a previously set air-fuel ratio threshold and when a learning value of the ignition timing that is set in accordance with the knock detected by the knock sensor 68 exists on the advance side of a previously set ignition timing threshold.

In addition, the idle speed control valve (idle air amount detection means) 36 for detecting an idle air amount of the engine is provided in this embodiment. The alcohol concentration estimating means 104 of the ECU 61 determines that the alcohol content level is high, when the sum of the air-fuel ratio detected by the A/F sensor 71 and the learning value exceeds the previously set air-fuel ratio threshold and when the idle air amount obtained based on the opening of the idle speed control valve 36 exceeds a previously set air amount threshold.

Herein after, fuel system abnormality determination control performed by the control device for an internal combustion engine of the embodiment is described concretely with reference to the flowcharts of FIGS. 3 to 6.

When the fuel system abnormality determination control is performed by the control device for an internal combustion engine of the embodiment, the ECU 61 reads a fuel system abnormality counter cfgafng in step S11 and thereafter executes an alcohol determination subroutine in step S12, as shown in FIGS. 1 and 3. Specifically, as shown in FIGS. 1 and 5, the ECU 61, in step S101, reads the current feedback value FAF of an A/F signal detected by the A/F sensor 71, reads a feedback learning value FGAF of the air-fuel ratio of this A/F signal in step S102, and then calculates an alcohol determination threshold FGAFALC corresponding to the air-fuel ratio in step S103. In step S104, the ECU 61 determines whether or not the sum of the feedback value FAF and the feedback learning value FGAF is greater than the alcohol determination threshold FGAFALC. In other words, the ECU 61 determines whether or not the target air-fuel ratio and the exhaust gas air-fuel ratio are shifted significantly.

When it is determined in step S104 that the sum of the feedback value FAF and the feedback learning value FGAF, is greater than the alcohol determination threshold FGAFALC, the ECU 61, in step S105, reads the current knocking learning value AGKNK for correcting the ignition timing on the basis of the feedback value of a knock signal detected by the knock sensor 68, and then calculates an alcohol determination threshold AGKNKALC corresponding to the ignition timing in step S106. Then, the ECU 61 determines in step S107 whether or not the knock learning value AGKNK is greater than the alcohol determination threshold AGKNKALC. In other words, the ECU 61 determines whether or not the ignition timing is closer to the advance side than usual.

When it is determined in step S107 that the knocking learning value AGKNK is greater than the alcohol determination threshold AGKNKALC, the ECU 61 determines in step S108 that the fuel currently used is the alcohol blended fuel. In this case, the alcohol concentration contained in the fuel can be determined based on the set value of the alcohol determination threshold FGAFALC corresponding to the air-fuel ratio and the set value of the alcohol determination threshold AGKNKALC corresponding to the ignition timing.

Specifically, because the alcohol fuel is more resistant to knocking than the gasoline fuel due to a high octane number of to the alcohol fuel, the engine power output and fuel efficiency can be improved by correcting the ignition timing to the advance side. Furthermore, the alcohol fuel is richer in theoretical air-fuel ratio than gasoline fuel because alcohol fuel contains a larger amount of oxygen than gasoline fuel. Therefore, when it is determined that the sum of the feedback value FAF and the feedback learning value FGAF is greater than the alcohol determination threshold FGAFALC and the knocking learning value AGKNK is greater than the alcohol determination threshold AGKNKALC or, in other words, the target air-fuel ratio and the exhaust gas air-fuel ratio are shifted significantly, it can be determined that the fuel contains a predetermined percentage or more of alcohol.

On the other hand, when it is determined in step S104 that the sum of the feedback value FAF and the feedback learning value FGAF is not greater than the alcohol determination threshold FGAFALC, the ECU 61 determines in step S109 that the fuel currently used is not the alcohol blended fuel but gasoline fuel.

When it is determined in step S107 that the knocking learning value AGKNK is not greater than the alcohol determination threshold AGKNKALC, the ECU 61 executes an intake air amount counter subroutine in step S110. Specifically, the ECU 61 determines in step S201 whether or not the idle speed control valve 36 is under control, that is, whether or not the engine runs during idling, as shown in FIGS. 1 and 6. When it is determined that the idle speed control valve 36 is under control, the ECU 61 reads an intake air amount counter ecgah in step S202. In step S203, the ECU 61 determines whether an air conditioner is ON. When it is determined that the air conditioner is ON, the ECU 61, in step S204, calculates a reference idling air amount GAIDL obtained when the air conditioner is activated. When it is determined that the air conditioner is not ON, the ECU 61, in step S205, calculates the reference idling air amount GAIDL obtained when the air conditioner is stopped. This reference idling air amount GAIDL is set based on the alternator and the engine speed, and is set large when the air conditioner is activated.

Then, the ECU 61 determines in step S206 whether or not the current intake air, amount GA detected by the airflow sensor 62 is greater than the reference idling air amount GAIDL. When it is determined that the intake air amount GA is greater than the reference idling air amount GAIDL, the ECU 61 counts up the intake air amount counter ecgah in step S207. When it is determined that the intake air amount GA is not greater than the reference idling air amount GAIDL, the ECU 61 counts down the intake air amount counter ecgah in step S208. The ECU 61 then stores the intake air amount counter ecgah in step S209.

Once the intake air amount counter subroutine is ended, the ECU 61 returns to the alcohol determination subroutine and calculates an alcohol determination threshold GAIDLALC corresponding to the intake air amount in step S111, as shown in FIGS. 1 and 5. The ECU 61 then determines in step S112 whether or not the intake air amount counter ecgah is greater than the alcohol determination, threshold GAIDLALC. Specifically, the ECU 61 determines whether or not the intake air amount obtained during idling is higher than usual.

When it is determined in step S112 that the intake air amount counter ecgah is greater than the alcohol determination threshold GAIDLALC, the ECU 61 determines in step S108 that the fuel currently used is the alcohol blended fuel.

Specifically, the engine torque becomes low because the alcohol fuel is lower in calorific value than the gasoline fuel, hence a necessary engine torque is secured by increasing the fuel injection amount and by correcting the air amount to the increase side. Therefore, when it is determined that the intake air amount counter ecgah is greater than the alcohol determination threshold GAIDLALC or, in other words, the intake air amount obtained during idling is higher than usual, it can be determined that the fuel contains a predetermined percentage or more of alcohol.

On the other hand, when it is determined in step S112 that the intake air amount counter ecgah is not greater than the alcohol determination threshold GAIDLALC, the ECU 61 determines in step S109 that the fuel currently used is not the alcohol blended fuel but gasoline fuel.

When it is determined that the fuel currently used is the alcohol blended fuel, the alcohol determination subroutine is ended. Returning to the fuel system abnormality determination control, the ECU 61 determines in step S13 whether or not the fuel currently used is determined to be the alcohol blended fuel, as shown in FIGS. 1 and 3. When it is determined that the fuel is the alcohol blended fuel, the ECU 61 determines in step S14 whether or not a history flag exalcclear of the fuel system abnormality counter cfgafag is in the OFF state. Because the history flag exalcclear is in the OFF state when the engine is started, the fuel system abnormality counter cfgafng is cleared (=0) in step S15 and the history flag exalcclear of the fuel system abnormality counter cfgafng is switched ON in step S16.

When, on the other hand, it is determined in step S13 that the fuel is not the alcohol blended fuel, steps S14, S15 and S16 are skipped and step S17 is performed. Also, when it is determined in step S14 that the history flag exalcclear of the fuel system abnormality counter cfgafng is not in the OFF state, steps S15 and S16 are skipped and the step S17 is performed.

The ECU 61, in step S17, reads the current engine coolant temperature THW detected by the water temperature sensor 67, and calculates fuel system abnormality determination permissible water temperature THWFOBD in step S18. Then, the ECU 61 determines in step S19 whether or not the current engine coolant temperature THW is higher than the fuel system abnormality determination permissible water temperature THWFOBD. When it is determined that the engine coolant temperature THW is not higher than the fuel system abnormality determination permissible water temperature THWFOBD, the ECU 61 returns to step S11 to repeat the processing. When it is determined that the engine coolant temperature THW is higher than the fuel system abnormality determination permissible water temperature THWFOBD, the ECU 61 moves to step S20.

Specifically, when the engine coolant temperature THW is low, the fuel injected from the injector 45 to the combustion chamber 18 adheres to the wall surfaces without being vaporized, which impedes the abnormality determination being performed on the fuel system with a high degree of precision. For this reason, the abnormality determination is not performed on the fuel system until the engine coolant temperature THW becomes higher than the fuel system abnormality determination permissible water temperature THWFOBD or, in other words, until engine warm-up is completed.

When it is determined that the engine coolant temperature THW is higher than the fuel system abnormality determination permissible water temperature THWFOBD, that is, when the engine warn-up is completed, the ECU 61, in step S20, reads the current feedback value FAF of an A/F signal detected by the A/F sensor 71, and then reads the feedback learning value FGAF of the fuel-air ratio of this A/F signal in step S21. The ECU 61 then confirms whether or not the fuel is determined to be the alcohol blended fuel in step S22. When it is determined that the fuel is the alcohol blended fuel, the ECU 61 sets a fuel system abnormality determination threshold efgafobd at a determination threshold FGAAFALC corresponding to the alcohol blended fuel in step S23. When it is determined that the fuel is not the alcohol blended fuel, the ECU 61 sets the fuel system abnormality determination threshold efgafobd at a determination threshold FGAFFOBD corresponding to the gasoline fuel in step S24.

Subsequently, as shown in FIGS. 1 and 4, the ECU 61 determines in step S25 whether or not the absolute value of the sum of the feedback value FAF and the feedback learning value FGAF is greater than the fuel system abnormality determination threshold efgafobd. Specifically, the ECU 61 determines whether or not the target air-fuel ratio and the exhaust gas air-fuel ratio are shifted significantly.

When it is determined in step S25 that the absolute value of the sum of the feedback value FAF and the feedback learning value FGAF is greater than the fuel system abnormality determination threshold efgafobd, the ECU 61 counts up the fuel system abnormality counter cfgafng in step S26. When it is determined that the absolute value of the sum of the feedback value FAF and the feedback learning value FGAF is not greater than the fuel system abnormality determination threshold efgafobd, the ECU 61 counts down the fuel system abnormality counter cfgafng in step S27. Then, the ECU 61 stores thus obtained fuel system abnormality counter cfgafng in step S28.

The ECU 61 sets a fuel system abnormality continuation determination threshold ecfgafng at CFGAFNGB in step S29, and determines in step S30 whether or not the fuel system abnormality counter cfgafng is greater than the fuel system abnormality continuation determination threshold ecfgafng. When it is determined that the fuel system abnormality counter cfgafng is greater than the fuel system abnormality continuation determination threshold ecfgafng, the ECU 61 determines in step S31 that there is an abnormality in the fuel system, activates the alarm device 76 to issue an alarm, and notifies a driver of the abnormality.

Specifically, when the absolute value of the sum of the feedback value FAF and the feedback learning value FGAF is greater than the fuel system abnormality determination threshold efgafobd, the fuel system abnormality counter cfgafng is counted up, and, when the fuel system abnormality counter cfgafng exceeds a previously set fuel system abnormality continuation determination threshold ecfgafng, it is determined that there is an abnormality in the fuel system. In other words, when the air-fuel ratio feedback value and the learning correction value are shifted significantly, it is determined that there is an abnormality in the fuel system.

When, on the other hand, it is determined in step S30 that the fuel system abnormality counter cfgafng is not greater than the fuel system abnormality continuation determination threshold ecfgafng, the ECU 61 sets a fuel system normality continuation determination threshold CFGAFOKB in step S32, and determines in step S33 whether or not the fuel system abnormality counter cfgafng is not greater than the fuel system normality continuation determination threshold CFGAFOKB. When it is determined that the fuel system abnormality counter cfgafng is not greater than the fuel system normality continuation determination threshold CFGAFOKB, the ECU 61 determines in step S34 that the fuel system is normal.

Specifically, when the absolute value of the sum of the feedback value FAF and the feedback learning value FGAF is not greater than the fuel system abnormality determination threshold efgafobd, the fuel system abnormality counter cfgafng is counted down, and, when the fuel system abnormality counter cfgafng is below a previously set fuel system normality continuation determination threshold CFGAFOKB, it is determined that the fuel system is normal. In other words, when the air-fuel ratio feedback value and the learning, correction value are not shifted significantly, it is determined that the fuel system is normal.

When it is determined in step S33 that the fuel system abnormality, counter cfgafng is no less than the fuel system normality continuation determination threshold CFGAFOKB, the ECU 61 returns to step S11 to continue the processing. Specifically, when the fuel system abnormality counter cfgafng is not greater than the fuel system abnormality continuation determination threshold ecfgafng and no less than the fuel system normality continuation determination threshold CFGAFOKB, abnormality of the fuel system cannot be determined properly. Hence, the abnormality determination processing is repeatedly performed by continuously detecting the air-fuel ratio and counting the fuel system abnormality counter cfgafng up or down.

As described above, the control device for an internal combustion engine according to the embodiment is provided with: the abnormality determination means 103 for determining the presence of an abnormality in the fuel system, such as the injector 45, by comparing the air-fuel ratio detected by the A/F sensor 71 with a previously set abnormality determination value (fuel system abnormality continuation determination threshold); the alcohol concentration estimating means 104 for estimating the alcohol concentration in the fuel based on the air-fuel ratio detected by the A/F sensor 71; and the abnormality determination value changing means 105 for changing the abnormality determination value based on the alcohol concentration estimated by the alcohol concentration estimating means 104.

Therefore, the abnormality determination means 103 determines the presence of an abnormality in the fuel system, such as the injector 45, by using the abnormality determination value that is set based on the alcohol concentration estimated by the alcohol concentration estimating means 104. Therefore, the presence of an abnormality in the fuel system can be determined highly accurately regardless of the alcohol concentration in the fuel.

The control device for an internal combustion engine according to the embodiment increases or reduces the abnormality determination value in proportion to the alcohol concentration, and the abnormality determination means 103 determines the presence of an abnormality in the fuel system when the sum of the air-fuel ratio detected by the A/F sensor 71 and the learning value exceeds the abnormality determination value. Therefore, the presence of an abnormality in the fuel system can be determined highly accurately by setting the abnormality determination value based on the alcohol concentration.

Also, in the control device for an internal combustion engine according to the embodiment, the number of times the sum of the air-fuel ratio detected by the A/F sensor 71 and the learning value exceeds the abnormality determination value is counted (fuel system abnormality counter), and the presence of an abnormality in the fuel system is determined when this counted number of times exceeds a previously set count threshold (fuel system abnormality continuation determination threshold). Therefore, the presence of an abnormality in the fuel system can be determined highly accurately in view of fluctuation of the air-fuel ratio detected by the A/F sensor 71.

Furthermore, the control device for an internal combustion engine according to the embodiment is provided with the knock sensor 68 for detecting a knocking of the engine. It is determined that the alcohol concentration is high, when the sum of the air-fuel ratio detected by the A/F sensor 71 and the learning value exceeds a previously set air-fuel ratio threshold (alcohol determination threshold) and when a learning value of the ignition timing that is set in accordance with the knock detected by the knock sensor 68 exists on the advance side of a previously set ignition timing threshold (alcohol determination threshold). As a result, the alcohol concentration can be detected based on the air-fuel ratio and the ignition timing, and cost reduction can be realize without requiring an alcohol sensor and the like.

Moreover, the control device for an internal combustion engine according to the embodiment is provided with the idle speed control valve 36 for detecting an idle air amount of the engine. It is determined that the alcohol content level is high, when the sum of the air-fuel ratio detected by the A/F sensor 71 and the learning value exceeds the previously set air-fuel ratio threshold (alcohol determination threshold) and when the idle air amount obtained based on the opening of the idle speed control valve 36 exceeds a previously set air amount threshold (alcohol determination threshold). As a result, the alcohol concentration can be detected based on the air-fuel ratio and the ignition timing, and cost reduction can be realize without requiring an alcohol sensor and the like.

Although the above embodiment has described the internal combustion engine of the invention as a cylinder injection engine, the internal combustion engine of the invention is not limited to this type and thus may be a port-injection engine or any internal combustion engine capable of executing lean combustion.

As described above, the control device for an internal combustion engine according to the invention is capable of highly accurately determining the presence of an abnormality in the fuel system regardless of the alcohol content in fuel, and is useful in any type of internal combustion engine.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A control method for an internal combustion engine, comprising:

setting a fuel injection amount based on an operational state of the internal combustion engine;

injecting a set predetermined amount of fuel;

detecting an air-fuel ratio of the internal combustion engine;

determining a presence of an abnormality in a fuel injection portion that injects the set predetermined amount of fuel, by comparing the detected air-fuel ratio with an abnormality determination value;

determining an alcohol content level in the fuel based on the detected air-fuel ratio; and changing the abnormality determination value depending on the determined alcohol content level.

2. A control device for an internal combustion engine, comprising:

a fuel injection amount setting portion that sets a fuel injection amount based on an operational state of the internal combustion engine;

a fuel injection portion that injects a predetermined amount of fuel that is set by the fuel injection amount setting portion;

an air-fuel ratio detection portion that detects an air-fuel ratio of the internal combustion engine;

an abnormality determination portion that determines a presence of an abnormality in the fuel injection portion by comparing the air-fuel ratio detected by the air-fuel ratio detection portion with an abnormality determination value;

an alcohol content level determination portion that determines an alcohol content level in the fuel based on the air-fuel ratio detected by the air-fuel ratio detection portion; and an abnormality determination value changing portion that changes the abnormality determination value depending on the alcohol content level determined by the alcohol content level determination portion.

3. The control device for an internal combustion engine according to claim 2, wherein the abnormality determination value is increased or decreased in proportion to the alcohol content level, and the abnormality determination portion determines the presence of the abnormality in the fuel injection portion when the air-fuel ratio detected by the fuel-air ratio detection portion exceeds the abnormality determination value.

4. The control device for an internal combustion engine according to claim 2, wherein the abnormality determination portion has an abnormality determination counter for counting the number of times the air-fuel ratio detected by the air-fuel ratio detection portion exceeds the abnormality determination value, and determines the presence of the abnormality in the fuel injection portion when the number of times counted by the abnormality determination counter exceeds a preset count threshold.

5. The control device for an internal combustion engine according to claim 2, wherein the abnormality determination value is set based on the air-fuel ratio detected by the air-fuel ratio detection portion and a learning value of the air-fuel ratio.

6. The control device for an internal combustion engine according to claim 5, wherein the learning value of the air-fuel ratio is used for correcting the air-fuel ratio detected by the air-fuel ratio detection portion, in accordance with the alcohol content level of the injected fuel.

7. The control device for an internal combustion engine according to claim 5, wherein the alcohol content level determination portion determines that the alcohol content level is high, when a sum of the air-fuel ratio detected by the air-fuel ratio detection portion and the learning value of the air-fuel ratio exceeds a preset air-fuel ratio threshold.

8. The control device for an internal combustion engine according to claim 7, further comprising a knock detection portion that detects a knocking generated in the internal combustion engine, wherein the alcohol content level determination portion determines that the alcohol content level is high, when the sum of the air-fuel ratio detected by the air-fuel ratio detection portion and the learning value of the air-fuel ratio exceeds the preset air-fuel ratio threshold and when a learning value of an ignition timing that is set in accordance with the knocking detected by the knock detection portion exists on an advance side of a preset ignition timing threshold.

9. The control device for an internal combustion engine according to claim 7, further comprising an idle air amount detection portion that detects an idle air amount in the internal combustion engine, wherein the alcohol content level determination portion determines that the alcohol content level is high, when the sum of the air-fuel ratio detected by the air-fuel ratio detection portion and the learning value of the air-fuel ratio exceeds the preset air-fuel ratio threshold and when the idle air amount detected by the idle air amount detection portion exceeds a preset air amount threshold.

10. The control device for an internal combustion engine according to claim 3, further comprising:
an engine coolant temperature detection portion that detects an engine coolant temperature,
wherein the abnormality determination is performed when the engine coolant temperature is greater than a preset coolant temperature threshold.

* * * * *